US011277513B2

(12) United States Patent
Han et al.

(10) Patent No.: US 11,277,513 B2
(45) Date of Patent: Mar. 15, 2022

(54) METHOD FOR OPERATING A DEVICE FOR HANDLING A PHONE CALL

(71) Applicant: Orange, Paris (FR)

(72) Inventors: Liang Han, Dongcheng District (CN); Zhihong Guo, Dongcheng District (CN)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/981,599

(22) PCT Filed: Mar. 28, 2019

(86) PCT No.: PCT/IB2019/000418
§ 371 (c)(1),
(2) Date: Sep. 16, 2020

(87) PCT Pub. No.: WO2019/186278
PCT Pub. Date: Oct. 3, 2019

(65) Prior Publication Data
US 2021/0021707 A1   Jan. 21, 2021

(30) Foreign Application Priority Data
Mar. 30, 2018  (CN) ................. PCT/CN2018/081263

(51) Int. Cl.
*H04M 3/436* (2006.01)
*H04M 3/533* (2006.01)
*H04M 3/42* (2006.01)

(52) U.S. Cl.
CPC ....... *H04M 3/436* (2013.01); *H04M 3/53308* (2013.01); *H04M 3/42059* (2013.01); *H04M 2250/12* (2013.01)

(58) Field of Classification Search
CPC ............ H04M 3/436; H04M 3/53308; H04M 3/42059; H04M 2250/12
(Continued)

(56) References Cited

U.S. PATENT DOCUMENTS 10,242,402 B1 *  3/2019  Soccorsy ............ G06Q 40/025
2002/0123333 A1 *  9/2002  Sato .................... H04W 8/183
                                                              455/415
(Continued)

FOREIGN PATENT DOCUMENTS

CN   101330694 A   12/2008
CN   102368844 A    3/2012
(Continued)

OTHER PUBLICATIONS

International Search Report dated Jul. 31, 2019, issued in Patent Cooperation Treaty Application No. PCT/IB2019/000418.
(Continued)

*Primary Examiner* — Binh Kien Tieu
(74) *Attorney, Agent, or Firm* — Knobbe, Martens, Olson & Bear, LLP

(57) ABSTRACT

A method for operating a device for handling a phone call is disclosed. In one aspect the method comprises (a) receiving a phone call from a calling party, (b) determining an action to be performed by the device among a predetermined list of actions related to the handling of a phone call, as a function at least of identity information about the calling party, and (c) performing the determined action for handling the phone call. The device may be programmable and mobile, e.g., a smartphone.

14 Claims, 3 Drawing Sheets

(58) Field of Classification Search
USPC ....... 455/414.1; 379/142.01, 142.04, 142.06, 379/142.07, 142.17
See application file for complete search history.

(56) References Cited

U.S. PATENT DOCUMENTS

| | | |
|---|---|---|
| 2005/0201362 A1 | 9/2005 | Klein et al. |
| 2006/0094404 A1 | 5/2006 | Burgess |
| 2010/0111281 A1* | 5/2010 | Levine .................. H04M 3/533 |
| | | 379/211.02 |
| 2012/0265717 A1* | 10/2012 | Narayanan ............... G06N 5/02 |
| | | 706/12 |
| 2021/0144248 A1* | 5/2021 | Hart .................... H04M 3/5235 |

FOREIGN PATENT DOCUMENTS

| | | |
|---|---|---|
| CN | 106331340 A | 1/2017 |
| CN | 106534554 A | 3/2017 |
| JP | 200312256 A | 11/2000 |

OTHER PUBLICATIONS

Notification of Transmittal of The International Search Report and The Written Opinion of the International Searching Authority or the Declaration for International Application No. PCT/CN2018/081263 dated Jan. 4, 2019.

* cited by examiner

METHOD FOR OPERATING A DEVICE FOR HANDLING A PHONE CALL

CROSS-REFERENCE TO RELATED APPLICATIONS

This application is filed under 35 U.S.C. § 371 as the U.S. National Phase of Application No. PCT/IB2019/000418 entitled "METHOD FOR OPERATING A DEVICE FOR HANDLING A PHONE CALL" and filed Mar. 28, 2019, and which claims priority to PCT/CN2018/081263 filed Mar. 30, 2018, each of which is incorporated by reference in its entirety.

BACKGROUND

Technological Field

The field of this invention is that of devices such as mobiles phones. More particularly, the invention relates to a method for operating such a device when receiving a phone call.

Description of the Related Technology

With devices such as mobile phones, it is common to receive a phone call from a calling party, and not to wish to answer it for various reasons (for example when the calling party is an advertiser or when it is not the proper time and/or place to answer the call).

Usually, the phone displays the calling phone number (or directly the name of the calling party if this number is already registered in a contact list of the phone), and from this information the user takes the decision to answer or reject the call (for instance by pressing a green or a red button the phone's interface).

The user can further subscribe to a "yellow pages" service which automatically searches for un unknown calling number, so that the phone may for instance display advertisement warning if it the incoming phone call is identified as being an advertisement.

However, the user must still take the decision to answer or reject the call and press the corresponding button.

For avoiding such handling, the user has only either the possibility to block some phone numbers (calls from these phone numbers will be automatically rejected) or the possibility (for example in iOS operating system) to use a "Do Not Disturb" mode (during a given time frame, all calls except emergency ones from a predetermined list of contacts will be rejected).

These two mechanisms, while somehow efficient, are limited, in particular with respect for advertisements and other unsolicited calls. Indeed, unknown or hidden numbers cannot be blocked by the first mechanism, and the second mechanism does not only block unsolicited calls and thus cannot be permanently turned on.

There is therefore a need for improving the user experience so as to avoid bothering the user with unsolicited calls, without risking the user to miss some unexpected but important calls.

SUMMARY OF CERTAIN INVENTIVE ASPECTS

For these purposes, the present invention provides a method for operating a device characterized in that it comprises the following steps of, performed by a processing unit of the device:

(a) receiving a phone call from a calling party;
(b) determining an action to be performed by the device among a predetermined list of actions related to the handling of a phone call, as a function at least of identity information about the calling party;
(c) performing said determined action for handling said phone call.

Such specific and dynamic action determination allows complex and self-learning of the user behavior for automatically dealing at the same time with unsolicited calls and unavailability time periods.

Preferred but non limiting features of the present invention are as follow:

said predetermined list of actions related to the handling of a phone call comprises at least one of the following actions:
  answering the phone call;
  rejecting the phone call;
  ringing the device.
in said predetermined list of actions related to the handling of a phone call, the action of rejecting the phone call is subdivided in at least the following actions:
  forwarding the phone call to a voicemail;
  rejecting the phone call without forwarding it to a voicemail;
The action of ringing the phone comprises informing a user of the device through a user interface of the phone call and prompting the user to decide whether to answer it or to reject the phone call;
step (a) comprises receiving data for establishing a phone call between the calling party and the device, and determining from the received data the identity information about the calling party;
step (b) comprises processing said identity information for attempting to identify a contact;
processing said identity information for attempting to identify a contact comprises searching for the identity information in a contact list stored in a memory of the device and/or searching for the identity information in a remote directory;
the identity information is a caller ID or the indication that no caller ID is available;
at least one of said actions, in the predetermined list of actions, has been predetermined (a0) on the basis at least of an action performed by the user in relation with a previous phone call from said calling party;
by default the predetermined action is ringing the device, said predetermined action being learnt as a function of how the user handle the phone call when the device is ringing;
the predetermined action is further determined as a function of contextual data;
the contextual data comprises acceleration data detected by an acceleration sensor of the device, wherein the action to be determined during step (a0) is learnt to be directly rejecting the phone call when the user has not answered the previous phone call while the acceleration data detected during the previous phone call are representative of the user having taken the device.

In a second aspect, the invention provides an electronic device comprising a processing unit configured to implement the following steps, when the electronic device receives a phone call from a calling party:

determining an action to be performed by the device among a predetermined list of actions related to the handling of a phone call, as a function at least of identity information about the calling party;

performing said determined action for handling said phone call.

According to a third and a fourth aspects, the invention provides a computer program product, comprising code instructions for executing a method according to the first aspect for operating a device; and a computer-readable medium, on which is stored a computer program product comprising code instructions for executing a method according to the first aspect for operating a device.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF CERTAIN ILLUSTRATIVE EMBODIMENTS

Architecture

Figure 1:
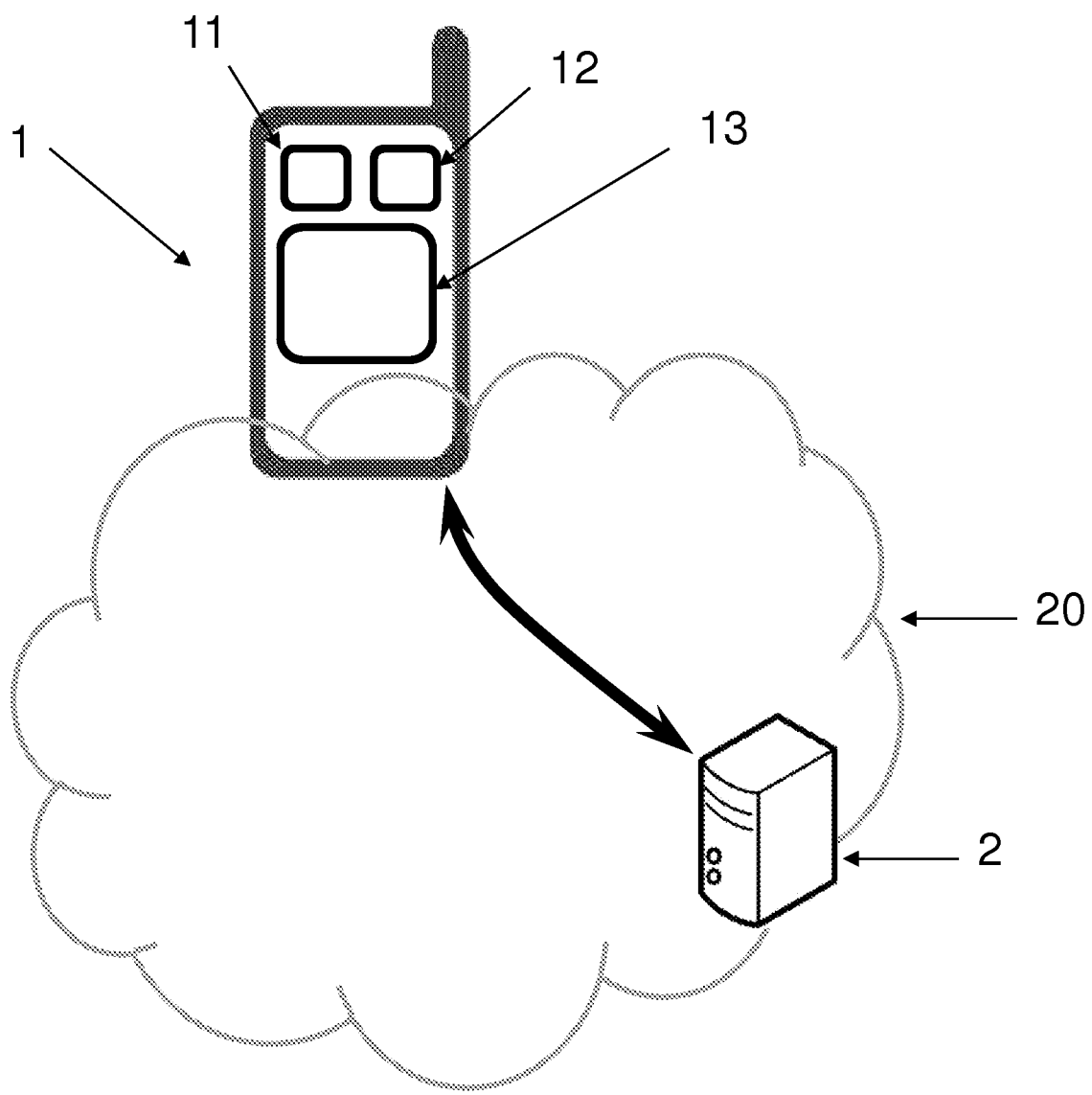
FIG. 1 illustrates an example of architecture in which the method according to the invention is performed.

The present invention relates to a method for operating a device 1 as represented by FIG. 1. As explained the device comprises a processing unit 11, i.e. a CPU (one of mode processors). The device 1 is able to handle a phone call, meaning that it comprises a user interface 13 including at least a audio input (for instance a microphone) and an audio output (for instance loud speaker). It is to be understood that the device 1 may just comprise a connector for a headset.

The device 1 typically further comprises a memory 12 (for example flash memory) and the user interface 13 generally includes a screen (possibly touch sensitive), and a vibration module.

The device 1 also typically comprises a battery for powering the processing unit 11 and other units. The device 1 may further comprise others units such as a location unit for providing location data representative of the position of the device 1 (using for example GPS, network triangulation, etc.), further sensors (such as an acceleration sensor, light sensor, etc.), a communication unit for connecting (in particular wirelessly) the device 1 to a network 20 (for example WiFi, Bluetooth, and preferably a mobile network, in particular a GSM/UMTS/LTE network, see below), etc.

This device 1 is typically a smartphone, a tablet computer, a laptop, etc. In the following description the example of a smartphone will be used, but the present invention is not limited to this embodiment as it is well known that computer can nowadays receive phone calls.

Figure 2:
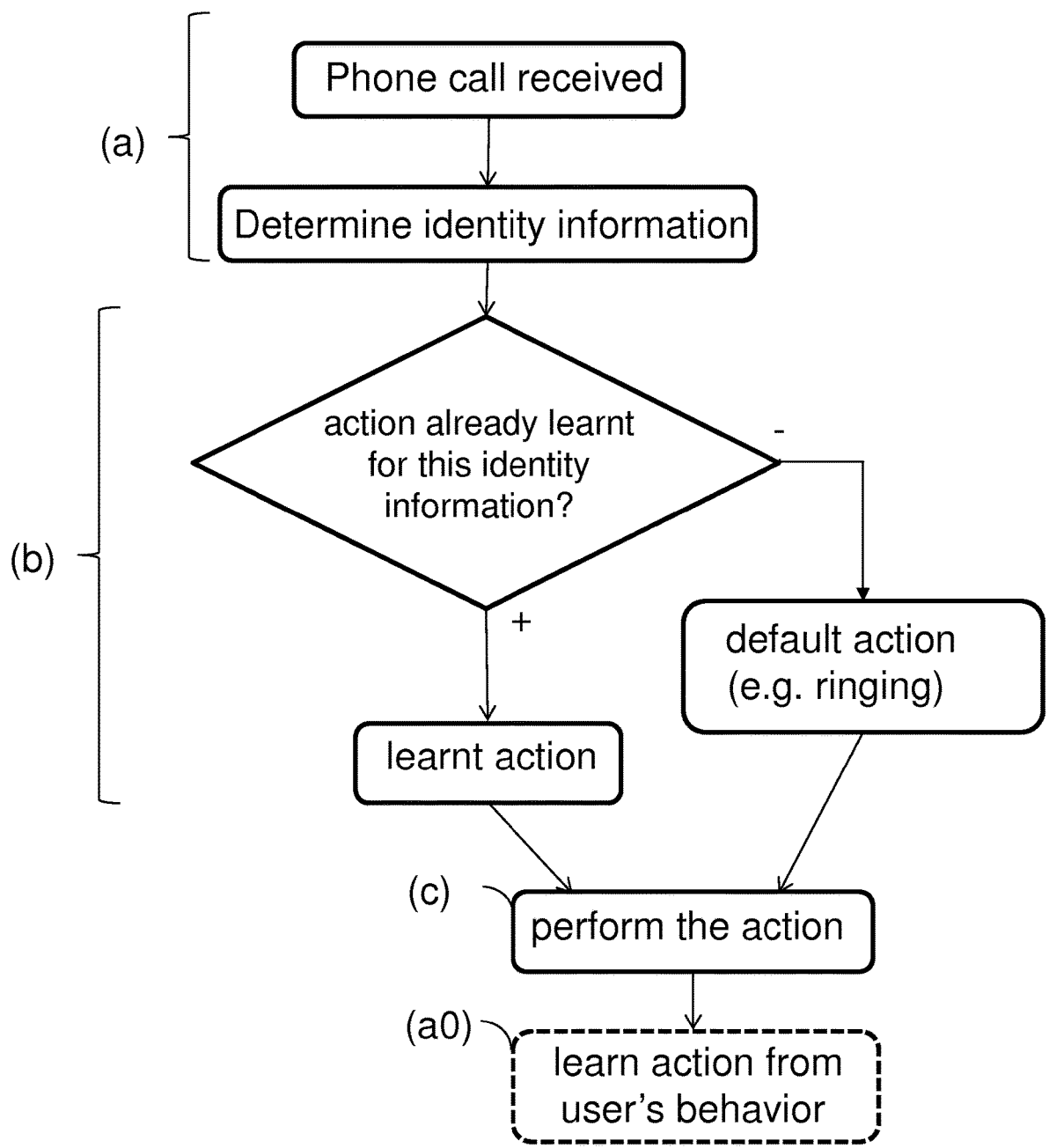
FIG. 2 illustrates a first embodiment of the method according to the invention.
Figure 3:
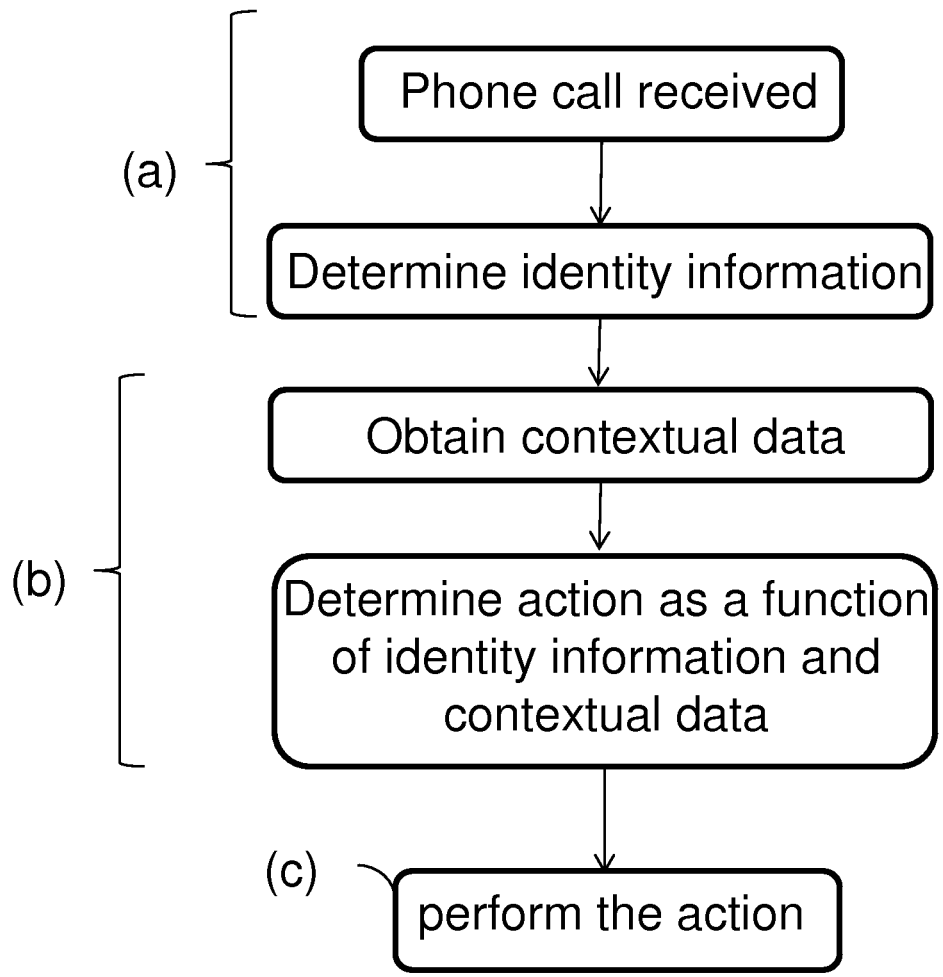
FIG. 3 illustrates a second embodiment of the method according to the invention.

We refer now to FIGS. 2 and 3 which illustrate various embodiments of the method according to the present invention.

Receiving a Phone Call

The present method can be implemented by an operating software of the device as handling calls is generally a basic functionality of a device such as a smartphone. Alternatively, the present method can be implemented by a dedicated application such as a "chat" application allowing voice calls and possibly video calls.

In all the embodiments of the method according to the present invention, in a first step (a), the processing unit 11 receives a phone call form a calling party (i.e. is being requested to handle this phone call through the user interface 13 of the device 1).

By "receiving a phone call", it is meant receiving (in particular from the communication unit) data for establishing a phone call, i.e. data representative of the intent of the calling party to establish a voice communication between the calling party and a called party (the device 1). This data generally comprises identity information about the calling party, which is in particular a caller ID, i.e. the telephone number of the calling party. It is to be understood that the calling party may mask its caller ID, and this absence of caller ID counts as identity information for the present method.

To sum up, step (a) preferably comprises receiving data for establishing a phone call between the calling party and the device, and determining from this data the identity information about the calling party, wherein "determining" can be understood as "attempting to identify": either the attempt is successful, meaning there is a caller ID to be found, and this caller ID is the identity information, or this attempt is failed, meaning that no caller ID can be found, and the identity information is the indication that no caller ID is available (e.g. the caller ID is masked).

Upon reception of this data, the processing unit 11 shall establish or not said voice communication.

Action Determination

In the conventional art, the processing unit 11 would normally "ring" the device, i.e. inform the user through the user interface 13 of the incoming phone call and prompt the user to decide whether to answer or to reject it. Alternatively, the processing unit 11 can perform a predetermined action about how to handle this present phone call (such as automatic rejection).

During the ringing, the user interface 13 advantageously displays the identity information of the calling party, for helping the user to decide whether to answer or to reject the phone call. It is generally provided that the devices rings during a predetermined time, and if the user has not actively answered the call at the expiration of this time, the call is automatically rejected and forwarded to a voicemail system (for letting the calling user record a message).

In the present invention however, in a further step (b), the processing unit determines an action to be performed by the device 1 among a predetermined list of actions related to the handling of a phone call, as a function at least of identity information about the calling party.

This step of determining an action is a positive step, by contrast with the prior art wherein the action is predetermined. It means that the way to handle a call may vary depending on the identity of the calling party, and even for the same calling party: according to the circumstances, a call from the same calling party may be automatically rejected or automatically accepted for example.

Only the predetermined list of actions is predetermined. It is to be understood that the actions of the list are actions related to the handling of a phone call, i.e. they only concern how to answer or not to the phone call, and not for instance notifications of an incoming call or personalization of a voicemail. These actions define whether the call is taken, and how.

Such a list advantageously comprises the following actions:
answering the phone call (without ringing the device 1), that is to say "directly" answering the phone call, i.e. without any intervention from the user;

rejecting the phone call (without ringing the device 1), that is to say "directly" rejecting the phone call, i.e. without any intervention from the user;

ringing the device 1 (i.e. normally handling the phone call).

The action of "rejecting the phone call" may encompass two distinct actions. In such a case, the predetermined list comprises the following subdivision of this rejecting action:

forwarding the phone call to a voicemail;

rejecting the phone call without forwarding it to a voicemail.

These "rejection" cases may themselves encompass different actions, such as sending, or not, a notification (such as a SMS) to the calling party, for instance to say "currently at work, please call me back later".

Preferably, step (b) comprises processing said identity information for attempting to identify a contact.

In a known way, such a processing may simply comprise searching for the identity information in a contact list stored in a memory 12 of the device 1.

Alternatively, or in addition (in particular if the identity information cannot be found in said contact list, i.e. the calling party is unknown to the called party), it may comprise searching for the identity information in a remote directory, preferably stored in a server 2. Such directory can be a directory of the "yellow pages" type, which enables for example to determine that the calling party is an advertiser.

Then, as explained, the action to be performed is determined within the list as a function of the identity information (and in particular the contact determined).

For example, it may be provided that if the calling user is an advertiser, the action determined is "rejecting the phone call and forwarding it to a voicemail".

In a step (c), the determined action for handling said phone call is performed, i.e. the call is rejected/answered, etc., in accordance with the action determined in step (b).

Further Improvements

In an embodiment illustrated by FIG. 2, the processing unit 11 learns from user actions, i.e. the action is determined in step (b) as a function of the previous actions of the user, in particular with previous phone calls from the same (or similar) identity information/contact.

In other words, at least one of said actions, in the predetermined list of actions, has been preferably predetermined in a step (a0) on the basis at least of an action performed by the user in relation with a previous phone call from the same calling party.

For instance, it may be determined that by default, the action for any identity information is "ringing the device", and if the processing unit 11 detects that the user performs several times in a row the same action when receiving a phone call from a specific calling party (for example the user rejects systematically phone calls from this specific calling party), then the processing unit 11 derives, from this user's actions, an action to be performed on future incoming phone call from this specific calling party and stores this action (for instance in a memory 12 where this action is stored in association with the identity information of this specific calling party).

For instance, in the example where the processing unit 11 detects that the user rejects systematically phone calls from a specific calling party, the processing unit 11 can learn from that user's behavior that the action to be performed on future phone calls, from the same calling party, is to reject the phone call and forward it to a voicemail.

If the processing unit 11 further detects, from user's interactions with the voicemail, that the user systematically deletes or ignores voicemail messages from this specific calling party, the processing unit 11 can adapt itself to this user's behavior and define that the action to be performed on future phone calls, from this specific calling party, is to reject the phone call without forwarding it to a voicemail.

In more general terms, it can be provided that when the user repeatedly "contradicts" the current predetermined action for phone calls from a given calling party, a new predetermined action can be set for phone calls from this calling party.

After having learnt from the user's actions, the processing unit 11 can directly define an action to performed, as a rule for an action to be determined in step (b). Alternatively, the processing unit 11 can propose this rule to the user for implantation upon acceptance, before applying it.

Learnt rules and/or actions can be stored in the memory 12 of the device 1, and the user may be able to manage them using an application (for example to remove a rule or an action if he wishes the corresponding automatic action to change).

It is to be understood that, as represented by FIG. 2, the step (a0) of an occurrence of the present method may advantageously occur at the end of a previous occurrence of the present method, i.e. the step (a0) is performed, in a first occurrence of the method, significantly before the others steps in a further occurrence of the method.

In another embodiment illustrated by FIG. 3 (which can be combined with the embodiment of FIG. 2), the action determination of step (b) may further be performed as a function of contextual data, in particular data from sensors of the device 1 and/or data such as time or location of the device 1, to make a more accurate action prediction.

Then step (b) may further comprise the identification of a behavior of the user from said contextual data. By behavior, it is meant a situation of the user such as "at work", "running", "sleeping", etc.

For example it may be provided that when the processing unit 11 detects that the user is at a given location (office) between 9 am and 6 pm, the user's behavior is "at work", and all calls from calling parties which are not referenced as "family" in the contact list of the device 1 are directly rejected. At 7 pm, a phone call from such calling parties will ring the device 1.

As another example, if the acceleration data show an acceleration continuously above a threshold, the processing unit 11 may derive that the user is jogging, and when receiving a phone call, the processing unit 11 can then determine as action to be performed to directly answer the phone call and put it on loudspeaker for avoiding the user to manipulate the device 1.

The behaviors of the user can be inputted, or learnt as previously explained.

For example, sometimes a user takes the device 1 because there is an incoming phone call, but after watching the displayed phone number, which is from an advertiser, he ignores the call. It means that the user usually answers calls at that time, but the user just does not want to answer this advertisement call. This behavior can be used for efficient learning.

In such a case, during the learning phase, monitoring the acceleration sensor of the mobile phone, to know that the user has taken the phone, then decided to ignore the advertising call on purpose, is useful.

In other words, in a preferred embodiment, the action to be determined for a given identity information is learnt to be rejecting the phone call when the user does not answer the phone call, and the acceleration data are representative of the user having taken the device 1.

Device and Computer Program

The present invention further proposes an electronic device 1 comprising a user interface 13 and a processing unit 11, adapted for carrying out the method for operating as previously described. This device 1 may also comprise a memory 12, and sensors. This processing unit 11 is configured to implement the steps of:

- receiving a phone call from a calling party (i.e. receiving data for establishing a phone call between the calling party and the device 1);
- optionally, determine from the received data the identity information about the calling party, and possibly processing said identity information for attempting to identify a contact by searching for the identity information in a contact list stored in the memory 12 of the device 1, and/or searching for the identity information in a remote directory
- determining an action to be performed by the device 1 among a predetermined list of actions related to the handling of a phone call, as a function at least of identity information about the calling party, and possibly as a function of the previous actions of the user and/or contextual data (in particular from the sensors);
- performing said determined action for handling said phone call.

The present invention further proposes a computer program product, comprising code instructions for executing (in particular with a processing unit 11 of the device 1) the previously described method as well as a computer-readable medium (in particular a memory 12 of the device 1), on which is stored a computer program product comprising code instructions for executing said method. In particular, this computer program product may be implemented by the operating system of the device or a dedicated communication application.

The invention claimed is:

1. A method of operating a device configured for phone calls and having a processing unit, the method comprising:
   - receiving a phone call from a calling party;
   - determining an action to be performed by the device among a predetermined list of actions related to the handling of a phone call, as a function at least of identity information about the calling party; and
   - performing the determined action for handling the phone call,
   - wherein at least one of the actions in the predetermined list of actions has been predetermined based at least on an action performed by a user in relation with a previous phone call from the calling party.

2. The method of claim 1, wherein the predetermined list of actions related to the handling of a phone call comprises at least one of the following actions:
   - answering the phone call;
   - rejecting the phone call; and
   - ringing the device.

3. The method of claim 2, wherein, in the predetermined list of actions related to the handling of a phone call comprises, the action of rejecting the phone call is subdivided into at least the following actions:
   - forwarding the phone call to voicemail; and
   - rejecting the phone call without forwarding it to voicemail.

4. The method of claim 2, wherein the action of ringing the phone comprises informing the user of the device through a user interface of the phone call and prompting the user to decide whether to answer or to reject the phone call.

5. The method of claim 1, wherein the receiving step comprises receiving data for establishing a phone call between the calling party and the device, and determining from the received data the identity information about the calling party.

6. The method of claim 1, wherein the determining step comprises processing the identity information for attempting to identify a contact.

7. The method of 6, wherein processing the identity information for attempting to identify a contact comprises searching for the identity information in a contact list stored in a memory of the device and/or searching for the identity information in a remote directory.

8. The method of claim 1, wherein the identity information is a caller ID or the indication that no caller ID is available.

9. The method of claim 1, wherein the action of ringing the phone comprises informing the user of the device through a user interface of the phone call and prompting the user to decide whether to answer or to reject the phone call and wherein by default the predetermined action is ringing the device, the predetermined action being learned as a function of how the user handles the phone call when the device is ringing.

10. The method of claim 1, wherein the predetermined action is further determined as a function of contextual data.

11. The method of claim 10, wherein by default the predetermined action is ringing the device, the predetermined action being learned as a function of how the user handles the phone call when the device is ringing, wherein the contextual data comprises acceleration data provided by an acceleration sensor of the device, wherein the action to be determined during step is learned to be rejecting the phone call when the user has not answered the previous phone call while the acceleration data provided during the previous phone call are representative of the user having taken the device.

12. A non-transitory computer program product storing code instructions for executing the method of claim 1 for operating a device configured to handle a phone call.

13. A non-transitory computer-readable medium, on which is stored a computer program product comprising code instructions for executing the method of claim 1 for operating a device configured to handle a phone call.

14. An electronic device for handling a phone call comprising:
   - a processing unit configured to execute software when the electronic device receives a phone call from a calling party so as to:
     - determine an action to be performed by the device among a predetermined list of actions related to the handling of a phone call, as a function at least of identity information about the calling party; and
     - perform the determined action for handling the phone call,
   - wherein at least one of the actions in the predetermined list of actions has been predetermined based at least on an action performed by a user in relation with a previous phone call from the calling party.

* * * * *